United States Patent
Hermle et al.

(10) Patent No.: US 6,717,333 B2
(45) Date of Patent: Apr. 6, 2004

(54) PIEZOELECTRIC ACTUATING DEVICE FOR CONTROLLING THE FLAPS ON THE ROTOR BLADE OF A HELICOPTER

(75) Inventors: Frank Hermle, Munich (DE); Peter Jaenker, Garching (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/221,814
(22) PCT Filed: Apr. 3, 2001
(86) PCT No.: PCT/DE01/01251
§ 371 (c)(1),
(2), (4) Date: Sep. 16, 2002
(87) PCT Pub. No.: WO01/76940
PCT Pub. Date: Oct. 18, 2001

(65) Prior Publication Data
US 2003/0137218 A1 Jul. 24, 2003

(30) Foreign Application Priority Data
Apr. 7, 2000 (DE) .......................... 100 17 332

(51) Int. Cl.[7] ............................................. H01L 41/08
(52) U.S. Cl. ............................................. 310/328
(58) Field of Search ................................... 310/328

(56) References Cited

U.S. PATENT DOCUMENTS

| | | | |
|---|---|---|---|
| 4,808,874 A | 2/1989 | Stahlhuth | 310/328 |
| 4,894,811 A * | 1/1990 | Porzio | 367/174 |
| 4,952,835 A | 8/1990 | Stahlhuth | 310/328 |
| 5,907,211 A | 5/1999 | Hall et al. | 310/328 |
| 6,010,098 A | 1/2000 | Campanile et al. | 244/35 |
| 6,208,026 B1 | 3/2001 | Bindig et al. | 257/718 |
| 6,236,146 B1 | 5/2001 | Cramer et al. | 310/366 |
| 6,273,681 B1 * | 8/2001 | Yamakawa et al. | 416/23 |
| 6,294,859 B1 * | 9/2001 | Jaenker | 310/328 |
| 6,419,187 B1 | 7/2002 | Buter et al. | 244/219 |
| 6,465,936 B1 * | 10/2002 | Knowles et al. | 310/328 |
| 6,614,143 B2 * | 9/2003 | Zhang et al. | 310/317 |

FOREIGN PATENT DOCUMENTS

| | | |
|---|---|---|
| DE | 19707392 | 8/1996 |
| DE | 19646676 | 4/1998 |
| DE | 19648545 | 5/1998 |
| DE | 19804308 | 4/1999 |
| EP | 0947422 | 10/1999 |

* cited by examiner

Primary Examiner—Thomas M. Dougherty
(74) Attorney, Agent, or Firm—Davidson, Davidson & Kappel, LLC

(57) ABSTRACT

A piezoelectric actuating device for controlling a flap on a rotor blade of a helicopter includes a piezo element arrangement including at least one piezoelectric stack actuator. A power transmission frame is coupled to the piezo element arrangement, the power transmission frame including an abutment and a driven element and generating a force therebetween from a change in length of the piezo element arrangement upon an excitation thereof, the force acting transversely to a direction of a centrifugal force of the rotor blade. A first holding device is provided including a pair of first flexible straps configured to fix the power transmission frame relative to the rotor blade in the direction of the centrifugal force and to allow the power transmission frame to move relative to the rotor blade transversely to the direction of the centrifugal force within a limited range. A second holding device is provided including a pair of second flexible straps configured to fix the abutment relative to the rotor blade transversely to the direction of the centrifugal force and to allow the abutment to move relative to the rotor blade in the direction of the centrifugal force within a limited range.

13 Claims, 1 Drawing Sheet

PIEZOELECTRIC ACTUATING DEVICE FOR CONTROLLING THE FLAPS ON THE ROTOR BLADE OF A HELICOPTER

BACKGROUND

The present invention relates to a piezoelectric actuating device for controlling the flaps on the rotor blade of a helicopter, including a piezo element arrangement that contains at least one piezoelectric stack actuator, and further including a power transmission frame which is coupled to the piezo element arrangement and attachable to a rotor blade and which generates a force between an abutment and a driven element, which are provided on the power transmission frame, from a change in length of the piezo element arrangement upon excitation thereof, the force acting transversely to the direction of the centrifugal force of the rotor blade, provision being made for a first holding device via which the power transmission frame can be fixed to the rotor blade in the direction of the centrifugal force but which is flexible transversely to the direction of the centrifugal force and which allows the power transmission frame to move transversely to the direction of the centrifugal force relative to the rotor blade within a limited range; and provision being made for a second holding device which fixes the abutment, which is provided on the power transmission frame, transversely to the direction of the centrifugal force relative to the rotor blade but is flexible in the direction of the centrifugal force and which allows the abutment to move in the direction of the centrifugal force relative to the rotor blade within a limited range.

Piezoelectric actuating devices are increasingly used in many fields of application and can be used to advantage especially in aerospace due to their small size and their high power density. Because of their high power density, piezoelectric actuating devices are particularly suitable for controlling the flaps on the rotor blades of helicopters. In this context, however, it is a problem that the piezoelectric actuating device must be guaranteed to be securely supported and decoupled against the centrifugal force (of up to 1000 g) occurring at the rotor blade.

German Patent DE 196 46 676 C1 and German Patent Application DE 196 48 545 A1 describe piezoelectric stack actuators in the form of stacked individual piezoelectric elements as could be provided in a piezo element arrangement contained in a piezoelectric actuating device and used for driving the same.

Moreover, U.S. Pat. Nos. 4,808,874 and 4,952,835 describe piezoelectrically driven amplifier mechanisms which amplify a stroke movement without using levers or motors.

Furthermore, U.S. Pat. No. 5,907,211 describes piezoelectric actuator which has an X-shaped configuration and is operated by two piezoelectric elements. The actuator is arranged within a housing, the actuation being accomplished via a corresponding displacement plate. Moreover, the actuator is attached to the housing by flexible holding devices which are formed in one piece. The actuator is used, for example, for controlling the servoflap of a rotor blade of a helicopter.

SUMMARY OF THE INVENTION

An object of the present invention is to provide a piezoelectric actuating device for controlling the flaps on the rotor blade of a helicopter which features a high degree of performance reliability and operational safety and at the same time markedly reduces the risk of damage to the piezoelectric element.

The present invention provides a piezoelectric actuating device for controlling the flaps on the rotor blade of a helicopter, including a piezo element arrangement that contains at least one piezoelectric stack actuator, and further including a power transmission frame which is coupled to the piezo element arrangement and attachable to the rotor blade and which generates a force between an abutment and a driven element, which are provided on the power transmission frame, from a change in length of the piezo element arrangement upon excitation thereof, the force acting transversely to the direction of the centrifugal force of the rotor blade, provision being made for a first holding device which fixes the power transmission frame on the rotor blade in the direction of the centrifugal force but is flexible transversely to the direction of the centrifugal force and which allows the power transmission frame to move transversely to the direction of the centrifugal force relative to the rotor blade within a limited range and provision being made for a second holding device which fixes the abutment, which is provided on the power transmission frame, transversely to the direction of the centrifugal force relative to the rotor blade but is flexible in the direction of the centrifugal force and which allows the abutment to move in the direction of the centrifugal force relative to the rotor blade within a limited range. According to the present invention, the first holding device contains two arrangements of first flexurally soft straps extending essentially parallel to each other in the direction of the centrifugal force, and the second holding device contains two arrangements of second flexurally soft straps extending essentially parallel to each other transversely to the direction of the centrifugal force which will allow the flexurally soft straps of the first holding device and of the second holding device to perform a parallelogram movement.

The piezoelectric actuating device has an advantage of being reliably and securely fixed against the high centrifugal force occurring at the rotor blade of a helicopter without thereby impairing the performance reliability of the actuating device.

Advantageously, the first holding device includes first holding elements which extend longitudinally in the direction of the centrifugal force and which are attached to the rotor blade at one end and to the power transmission frame of the actuating device at the other end. These guarantee that the power transmission frame is reliably supported against the centrifugal force, the driven element and the abutment at the same time being allowed to move without restriction in the manner intended for this.

Preferably, the first holding elements are formed of straps which are flexurally soft transversely to the direction of the centrifugal force of the rotor blade. Such straps allow the power transmission frame to move without restriction transversely to the direction of the centrifugal force, the power transmission frame at the same time being reliably fixed in the direction of the centrifugal force. Moreover, the use of such flexurally soft straps allows the power transmission frame to be fixed in the third direction as well, i.e., in a direction perpendicular to the plane defined by the direction of the centrifugal force and the intended direction of motion of the abutment and the driven element.

Preferably, the first holding device contains two arrangements of first flexurally soft straps extending essentially parallel to each other in the direction of the centrifugal force. This permits a quasi parallelogram movement of the flexurally soft straps relative to the power transmission frame and relative to a centrifugal force fastener which is provided on the rotor blade and to which the first holding elements are fixed. In an embodiment, each of the two arrangements of first flexurally soft straps contains only one such strap so that the power transmission frame is held by two first straps running parallel to each other in the direction of the centrifugal force.

On the side of the power transmission frame, the first holding elements are advantageously attached to the abutment or in the vicinity thereof or to the driven element or in the vicinity thereof, respectively.

According to an embodiment of the piezoelectric actuating device according to the present invention, the second holding device includes second holding elements which extend transversely to the direction of the centrifugal force and are connected to the abutment at one end and, at the other end, to a fastening element which is used for attachment to the rotor blade. This allows the power transmission frame of the actuating device to move in a defined manner in the direction of the centrifugal force so that power transmission frame is decoupled from the centrifugal force to the largest extent possible with regard to the motion of the driven element and the abutment relative to each other.

Preferably, the second holding elements are also formed of flexurally soft straps which here, however, are arranged in such a manner that they are flexible in the direction of the centrifugal force of the rotor blade. This permits motion between the fastening element and the abutment in the intended direction in the direction of the centrifugal force, the power transmission frame, on the other hand, being fixed in a direction perpendicular to the plane defined by the direction of the centrifugal force and the working direction between the abutment and the driven element.

Preferably, the second holding device contains two arrangements of second flexurally soft straps extending essentially parallel to each other transversely to the direction of the centrifugal force. This, in turn, permits a parallelogram movement between the fastening element and the abutment; each of the two arrangements of second flexurally soft straps in the simples and preferred case containing only one such strap so that the second holding device is formed of two flexurally soft straps running essentially parallel to each other transversely to the direction of the centrifugal force.

Preferably, the piezo element arrangement of the actuating device contains at least one piezoelectric stack actuator extending longitudinally in its working direction, and the power transmission frame includes working yokes which are coupled to the respective ends of the piezo element arrangement as well as driven legs which connect the working yokes and extend approximately parallel to the longitudinal direction of the piezo element arrangement and which feature driven regions in the form of the abutment and the driven element in a central region between the working yokes, the driven legs together with the working yokes forming a flexible arrangement in terms of a displacement of the driven regions relative to each other in a direction perpendicular to the longitudinal direction of the piezo element arrangement, the flexible arrangement converting an expansion and contraction of the piezo element arrangement in its longitudinal direction to a movement of the abutment and the driven element relative to each other in a direction perpendicular to the longitudinal direction of the piezo element arrangement.

Preferably, the above mentioned embodiment is designed in such a manner that the piezo element arrangement is coupled with its ends to the center of each working yoke, respectively, and that each working yoke is provided with driven legs in pairs which oppose each other with respect to the center of the respective working yoke and which are each flexibly connected at one end to each side of a working yoke and which, at the other end, extend toward the driven regions in the form of the abutment and the driven element, respectively, which are located in the central region.

According to an embodiment of the piezoelectric actuating device according to the present invention, the driven legs are constituted by intrinsically rigid single legs which are hinged in the central region and at the ends that are associated with the working yokes.

According to a preferred refinement thereof, in each case two parallel, spaced apart driven legs are provided between each side of a working yoke and a driven region in the form of the abutment or the driven element, respectively, the driven legs performing a parallelogram-like movement during a movement of the abutment and the driven element. The special advantage of this is an increased stability of the power transmission frame against the arising high centrifugal forces.

Preferably, the first holding elements are provided at their end which is intended for attachment to the rotor blade with fastening loops which are integrally formed with the first holding elements, According to an embodiment of the piezoelectric actuating device, provision is made for the power transmission frame, which includes the working yokes, the driven legs, and the driven regions in the form of the abutment and the driven element, to be manufactured in one piece together with the first holding elements and the second holding elements, including the fastening elements used for attachment to the rotor blade. This advantageously allows for inexpensive manufacture of a piezoelectric actuating device according to the present invention which features a high degree of reliability and operational safety.

According to an alternative embodiment, the driven legs can be formed of a thin flexible strap material instead of in the form of intrinsically rigid single legs, the strap material featuring a low flexural stiffness in the direction of its thickness and a high rigidity in the transverse direction.

BRIEF DESCRIPTION OF THE DRAWINGS

In the following, the present invention will be explained in greater detail based on exemplary embodiments with reference to the drawings.

DETAILED DESCRIPTION

Figure 1:
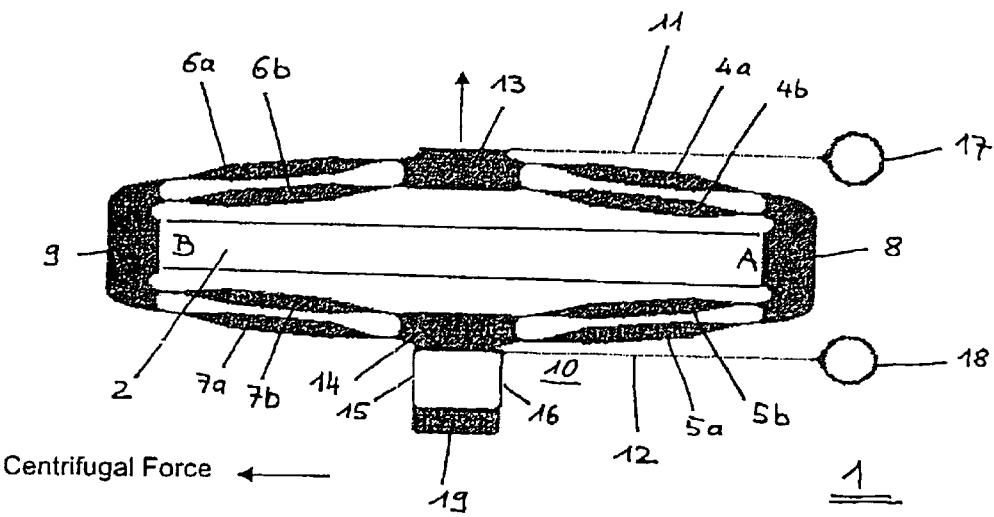
FIG. 1 shows a lateral view of a piezoelectric actuating device according to an exemplary embodiment of the present invention.
Figure 2:
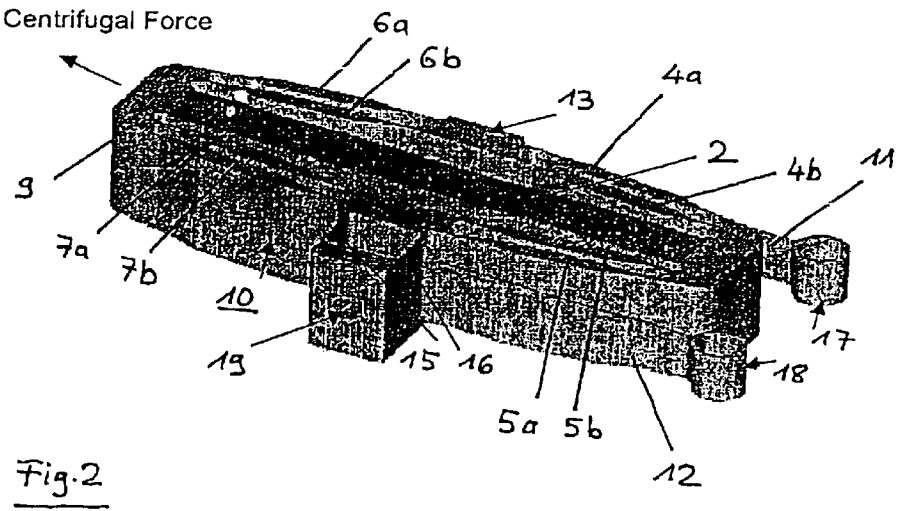
FIG. 2 is a perspective view of the piezoelectric actuating device shown in FIG. 1.

The piezoelectric actuating device which is shown in the lateral view in FIG. 1 and in the perspective view in FIG. 2 and which, as a whole, is provided with reference numeral 1, is composed of a piezoelectric stack actuator 2 and a power transmission frame which, as a whole, is provided with reference numeral 10. Piezoelectric stack actuator 2 is a longitudinally extending structure and formed of a plurality of individual piezoelectric elements which are arranged in layers one over another, as is known per se. Power transmission frame 10 is composed of two working yokes 8,9 which are coupled to respective ends A and B of stack actuator 2 and of a number of driven legs 4a,b, 5a,b, 6a,b and 7a,b, a driven element 13 and an abutment 14. Piezo element arrangement 2 is coupled with its ends A,B to the center of each working yoke 8,9, respectively, working yokes 8,9 being wider than piezo element arrangement 2 and projecting over piezo element arrangement 2 on both sides. On both sides of each working yoke 8,9, driven legs 4a,b, 5a,b and 6a,b and 7a,b are each attached in pairs with the one ends, respectively, the other ends of the driven legs being connected to driven element 13 or to abutment 14, respectively, namely the ends of driven legs 4a,b and 6a,b to driven element 13, and the ends of driven legs 5a,b and 7a,b to abutment 14. Power transmission frame 10 generates a force between abutment 14 and driven element 13 from a change in length of piezo element arrangement 2 upon excitation thereof, the force acting transversely to the longitudinal extension of the piezo element arrangement as is shown by the arrow at driven element 13. When piezo element arrangement 2 expands longitudinally, driven element 13 and abutment 14 are moved relative to and toward each other transversely to the longitudinal extension of piezo element arrangement 2. A contraction of piezo element arrangement 2 reverses the described movement.

Longitudinally extending first holding elements 111,12 in the form of flexurally soft straps which are provided with fastening loops 17 and 18 at their ends are provided on power transmission frame 10, namely at driven element 13 and at abutment 14. The piezoelectric actuating device, which is designed for controlling the flaps of the rotor blade, is attached to the rotor blade of a helicopter via these first holding elements 11,12. The attachment is accomplished in such a manner that first holding elements 11,12 extend with their longitudinal direction parallel to the direction of the centrifugal force of the rotor blade. Using first holding elements 11,12, therefore, a first fixing is accomplished which fixes power transmission frame 10 on the rotor blade in the direction of the centrifugal force but is flexible transversely to the direction of the centrifugal force and which allows power transmission frame 10 to move transversely to the direction of the centrifugal force relative to the rotor blade within a limited range (the centrifugal force is represented by arrows in FIGS. 1 and 2).

Also provided are second holding elements 15, 16 in the form of further flexurally soft straps which are connected to abutment 14 at one end and, at the other end, to a fastening element 19 which is used for attachment to the rotor blade. Second flexurally soft holding elements 15,16 extend essentially parallel to each other transversely to the direction of the centrifugal force of the rotor and fix power transmission frame 10 transversely to the direction of the centrifugal force relative to the rotor blade but are flexible in the direction of the centrifugal force and allow abutment 14 to move in the direction of the centrifugal force relative to the rotor blade within a limited range.

Driven legs 4a,b, 5a,b, 6a,b, 7a,b are constituted by intrinsically rigid single legs which, in the central region, namely at driven element 13 and at abutment 14 as well as at working yokes 8,9, are hinged to the mentioned elements. Between each side of a working yoke 8,9 and abutment 14 or driven element 13, respectively, provision is made in each case for two driven legs, namely driven legs 4a and 4b, 5a and 5b, 6a and 6, and 7a and 7b, respectively, which are in each case parallelly spaced apart from each other and which perform a parallelogram-like movement during a movement of abutment 14 and driven element 13.

Via first holding elements 11,12 and second holding elements 15,16, power transmission frame 10 is, on one hand, reliably and securely fixed against the high centrifugal force acting on the rotor blade, which can amount to up to 1000 g; on the other hand, driven element 13 and abutment 14 have sufficient degrees of freedom so that these two elements are sufficiently decoupled from the centrifugal force as well as from fastening elements 17, 18, 19 to be able to work without being unfavorably influenced.

In the exemplary embodiment shown in FIGS. 1 and 2, first holding elements 11,12 are integrally formed with the fastening loops 17, 18 at their ends which are intended for attachment to the rotor blade, and working yokes 8,9, driven legs 4a,b, 5a,b, 6a,b, 7a,b, and the driven regions in the form of abutment 14 and driven element 13, which together form power transmission frame 10, are formed in one piece together with first holding elements 11,12 and second holding elements 15,16, including fastening element 19 which is used for attachment to the rotor blade.

What is claimed is:

1. A piezoelectric actuating device for controlling a flap on a rotor blade of a helicopter, comprising:

a piezo element arrangement including at least one piezoelectric stack actuator;

a power transmission frame coupled to the piezo element arrangement, the power transmission frame including an abutment and a driven element and generating a force therebetween from a change in length of the piezo element arrangement upon an excitation thereof, the force acting transversely to a direction of a centrifugal force of the rotor blade;

a first holding device including a pair of first flexible straps extending substantially parallel to each other in the direction of the centrifugal force and configured to fix the power transmission frame relative to the rotor blade in the direction of the centrifugal force and to allow the power transmission frame to move relative to the rotor blade transversely to the direction of the centrifugal force within a limited range, the pair of first flexible straps being configured to perform a first parallelogram movement; and a second holding device including a pair of second flexible straps extending substantially parallel to each other transversely to the direction of the centrifugal force and configured to fix the abutment relative to the rotor blade transversely to the direction of the centrifugal force and to allow the abutment to move relative to the rotor blade in the direction of the centrifugal force within a limited range, the pair of second flexible straps being configured to perform a second parallelogram movement.

2. The piezoelectric actuating device as recited in claim 1 wherein the first holding device is configured to attach to the rotor blade at a first end of the first holding device and to attach to the power transmission frame at a second end of the first holding device.

3. The piezoelectric actuating device as recited in claim 2 wherein the first holding device is configured to attach to a side of the power transmission frame at or near at least one of the abutment and the driven element.

4. The piezoelectric actuating device as recited in claim 1 wherein the second holding device is configured to attach to the abutment at a first end of the second holding device and to attach to a fastening element at a second end of the holding device, the fastening element being configured to attach to the rotor blade.

5. The piezoelectric actuating device as recited in claim 1 wherein:

at least one piezoelectric stack actuator extends in a longitudinal working direction thereof; and the power transmission frame includes a first and a second working yoke each coupled to a respective end of the piezo element arrangement and a first, second, third and fourth pair of driven legs extending approximately parallel to the longitudinal direction in a central region between the working yokes, the first pair of driven legs connecting the first working yoke to the driven element, the second pair of driven legs connecting the first working yoke to the abutment, the third pair of driven legs connecting the second working yoke to the driven element, and the fourth pair of driven legs connecting the second working yoke to the abutment, the pairs of driven legs and the working yokes forming a flexible arrangement SO as to permit a displacement of the abutment and the driven element relative to each other in a direction perpendicular to the longitudinal direction, the flexible arrangement converting the change in length of the piezo element arrangement to a movement of the abutment and the driven element relative to each other in a direction perpendicular to the longitudinal direction, the change in length of the piezo element arrangement being in the longitudinal direction.

6. The piezoelectric actuating device as recited in claim 1 wherein the power transmission frame includes a first working yoke coupled to a first end of the piezo element arrangement and a second working yoke coupled to a second end of the piezo element arrangement, and a first, second, third and fourth pair of driven legs, the first and second pair of driven legs being disposed opposite each other relative to a center of the first working yoke, each driven leg of the first and second pairs of driven legs being flexibly connected at a respective first and thereof to the first yoke, the third and fourth pair of driven legs being disposed opposite each other relative to a center of the second working yoke, each driven leg of the third and fourth pairs of driven legs being flexibly connected at a respective first end thereof to the second yoke, respective second ends of the driven legs of the first and third driven legs extending toward the driven element in a central region between the first and second working yokes, respective second ends of the driven legs of the second and fourth pairs of driven legs extending toward the abutment in the central region.

7. The piezoelectric actuating device as recited in claim 6 wherein each driven leg of the pairs of driven legs includes an intrinsically rigid single leg element hinged in the central region and at a respective end associated with a respective one of the first and second working yokes.

8. The piezoelectric actuating device as recited in claim 6 wherein each driven leg of the pairs of driven legs includes an intrinsically rigid single leg element hinged in the central region and at a respective end associated with a respective one of the first and second working yokes.

9. The piezoelectric actuating device as recited in claim 7 wherein:

the first pair of driven legs is disposed between a first side of the first working yoke and the driven element;

the second pair of driven legs is disposed between a second side of the first working yoke and the abutment;

the third pair of driven legs is disposed between a first side of the second working yoke and the driven element; and the fourth pair of driven legs is disposed between a second side of the second working yoke and the abutment;

wherein the driven legs of each respective pair of driven legs are parallelly spaced apart from each other and are configured to perform a parallelogram-like movement during a movement of the abutment and the driven element.

10. The piezoelectric actuating device as recited in claim 8 wherein:

the first pair of driven legs is disposed between a first side of the first working yoke and the driven element;

the second pair of driven legs is disposed between a second side of the first working yoke and the abutment;

the third pair of driven legs is disposed between a first side of the second working yoke and the driven element; and the fourth pair of driven legs is disposed between a second side of the second working yoke and the abutment;

wherein the driven legs of each respective pair of driven legs are parallelly spaced apart from each other and are configured to perform a parallelogram-like movement during a movement of the abutment and the driven element.

11. The piezoelectric actuating device as recited in claim 2 wherein the first holding device includes a plurality of fastening loops at the first end thereof, the fastening loops being integral with the first holding device.

12. The piezoelectric actuating device as recited in claim 5 wherein:

the second holding device includes a fastening element configured to attach to the rotor blade; and the power transmission frame is integral with the first holding device and the second holding device.

13. The piezoelectric actuating device as recited in claim 1 wherein the power transmission frame includes a first and a second working yoke each coupled to a respective end of the piezo element arrangement and a plurality of driven legs connecting the working yokes to the abutment and the driven element and extending approximately parallel to a longitudinal direction of the piezo element arrangement in a central region between the working yokes, the plurality of driven legs together with the working yokes forming a flexible arrangement so as to permit a displacement of the abutment and the driven element relative to each other in a direction perpendicular to the longitudinal direction of the piezo element arrangement, the driven legs including a thin flexible strap material having a low flexural stiffness in a thickness direction and a high rigidity in a transverse direction.

* * * * *